United States Patent [19]
Suzuki et al.

[11] Patent Number: 4,853,768
[45] Date of Patent: Aug. 1, 1989

[54] COLOR IMAGE PROCESSING APPARATUS WITH LINEAR MASKING CIRCUIT HAVING COEFFICIENTS WHICH VARY IN ACCORDANCE WITH THE LEVELS OF COLOR COMPONENT SIGNALS

[75] Inventors: Akio Suzuki, Tokyo; Masaharu Ohkubo; Yoshihiro Takada, both of Yokohama, all of Japan

[73] Assignee: Canon Kabushiki Kaisha, Tokyo, Japan

[21] Appl. No.: 945,945

[22] Filed: Dec. 24, 1986

[30] Foreign Application Priority Data

Dec. 26, 1985 [JP] Japan .............................. 60-292154
Jun. 5, 1986 [JP] Japan .............................. 61-130704

[51] Int. Cl.[4] .......................... G03F 3/08; H04N 1/46
[52] U.S. Cl. .............................................. 358/80
[58] Field of Search .................................. 358/80

[56] References Cited

U.S. PATENT DOCUMENTS

| | | | |
|---|---|---|---|
| 3,100,815 | 8/1963 | Drake et al. | 355/80 |
| 3,194,882 | 7/1965 | Hall | 358/80 |
| 3,324,235 | 6/1967 | Kyte | 358/80 |
| 4,533,928 | 8/1985 | Sugiura et al. | 358/80 |
| 4,631,578 | 12/1986 | Sasaki et al. | 358/80 |
| 4,643,563 | 2/1987 | Sayanagi | 358/80 |
| 4,682,186 | 7/1987 | Sasaki et al. | 358/80 |
| 4,682,216 | 7/1987 | Sasaki et al. | 358/80 |
| 4,683,492 | 7/1987 | Sugiura et al. | 358/80 |
| 4,758,885 | 7/1988 | Sasaki et al. | 358/80 |

FOREIGN PATENT DOCUMENTS

| | | | |
|---|---|---|---|
| 1138521 | 12/1982 | Canada . | |
| 3020201 | 12/1980 | Fed. Rep. of Germany . | |
| 3047633 | 10/1981 | Fed. Rep. of Germany . | |
| 57-147377 | 9/1982 | Japan | 358/80 |
| 58-195364 | 11/1983 | Japan | 358/80 |
| 81/02706 | 10/1981 | PCT Int'l Appl. . | |
| 1369702 | 10/1974 | United Kingdom . | |

*Primary Examiner*—James J. Groody
*Assistant Examiner*—Randall S. Svihla
*Attorney, Agent, or Firm*—Fitzpatrick, Cella, Harper & Scinto

[57] ABSTRACT

A color processing apparatus performs the masking process of a color image by receiving a plurality of color component signals, and has a masking circuit for performing a linear masking process for the plurality of color component signals. The masking process utilizes a plurality of coefficients each of which has a particular value. The value of at least one of the coefficients of the masking circuit is varied in accordance with levels of the plurality of color component signals. A signal indicative of an amount of one kind of colorant which is to be recorded prior to the recording of other kinds of colorants can be discriminated, and a signal level which indicates the amount of the other kinds of colorants to be recorded on the same area after the recording of the one kind of colorant is corrected in accordance with the discrimination result.

13 Claims, 10 Drawing Sheets

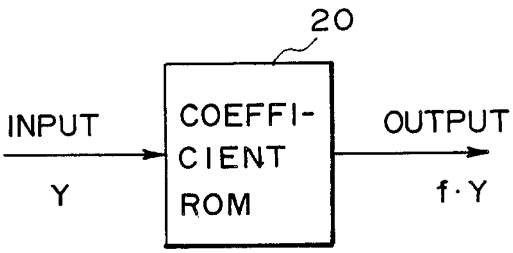
F I G. 12
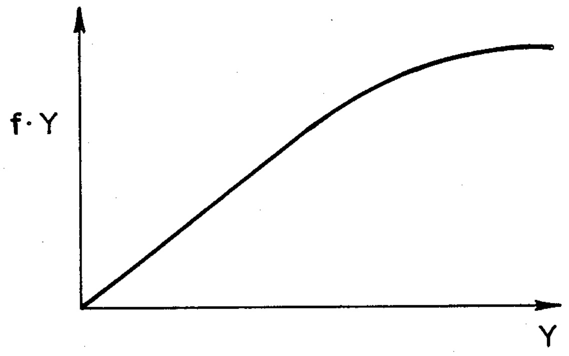
F I G. 13
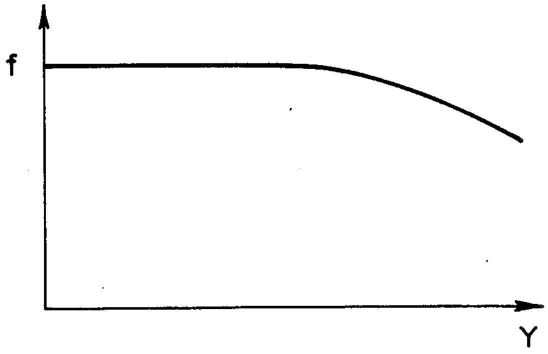
F I G. 14

COLOR IMAGE PROCESSING APPARATUS WITH LINEAR MASKING CIRCUIT HAVING COEFFICIENTS WHICH VARY IN ACCORDANCE WITH THE LEVELS OF COLOR COMPONENT SIGNALS

FIELD OF THE INVENTION

The present invention relates to a color processing apparatus for performing the masking process of a color image.

BACKGROUND OF THE INVENTION

Hitherto, a color processing apparatus of a color image in which color image information is input and subjected to the color correcting process and then output to a color printer has been used.

In such a kind of color processing apparatus, since the printing ink or toner is not completely cyan, magenta, and yellow, the color correcting process is generally performed by way of a linear masking method.

FIG. 3 shows a conventional color processing apparatus using the linear masking method. A color image to be read is color separated and read out by a readout unit 1 and converted into density signals Y, M, and C of yellow, magenta, and cyan from densities Dr, Dg, and Db of the red, green, and blue light. These density signals are sent to a color processing apparatus 11. In the color processing apparatus 11, the input color signals Y, M, and C are converted into the desired color signals Y', M', and C' according to the characteristics of the printing ink or toner on the basis of the following density expressions called linear masking equations and sent to various color printers (output unit) 13 such as ink jet color printer, thermal transfer copying color printer, electrophotographic color printer, and the like.

$$Y' = a_1Y - a_2M - a_3C \quad (1)$$

$$M' = -a_4Y + a_5M - a_6C \quad (2)$$

$$C' = -a_7Y - a_8M + a_9C \quad (3)$$

The output unit 13 prints color inks in yellow, magenta, and cyan in accordance with the signals (signals which were subjected to the masking process) Y', M', and C' after they were subjected to the color correcting process, respectively, thereby reproducing a color image on a recording medium.

The color component of each printing ink or toner of yellow, magenta, and cyan actually includes the other color components. Therefore, the correction coefficients $a_1$ to $a_9$ of the expressions (1) to (3) are set to the proper values in accordance with the characteristics of the ink or toner and the color component is corrected.

For example, $a_2$ in the expression (1) is the coefficient to correct the yellow component contained in the magenta ink or toner and $a_3$ is the coefficient to correct the yellow component contained in the cyan ink or toner.

Such a linear masking method can be realized by a simple circuit arrangement and the coefficients can be easily optimized by the computer simulation; therefore, this method is widely used.

However, in general, the output characteristics in the actual color printers such as ink jet color printer, thermal transfer copying color printer, electrophotographic color printer, and the like are not linear and the characteristics in the case of mixed colors are further complicated nonlinear characteristics.

Therefore, according to the linear masking method, the color correcting processes which can sufficiently correct the color characteristics of the printing ink or toner of the printer cannot be realized. This causes the problem that the color difference between the original image and the output reproduced image is small with respect to certain colors but is large with respect to other colors.

To avoid such problems, a nonlinear masking method whereby the color processes are executed by quadratic masking equations is also proposed. However, the circuit constitution and simulation are complicated even with this masking method, and it is difficult to completely correct the complicated color characteristics of the printer.

On the other hand, as a method of perfectly correcting the color characteristics of the printer, a color correcting method whereby one set of outputs of Y', M', and C' are made to correspond to each combination of the densities of the input data of three colors of Y, M, and C is known.

FIG. 4 shows a color conversion memory according to the above method. The digital color density signals Y, M, and C of three colors of yellow, magenta, and cyan which are input from the readout unit 1 are input as the address data of a color conversion memory 15. The conversion data Y', M', and C' of three colors which have been preliminarily stored in a table in the memory 15 are read out on the basis of the address data and output to the output unit 13. The output unit 13 prints the color images of yellow, magenta, and cyan on the recording medium in correspondence to the conversion data Y', M', and C'.

According to this conversion data storing method, since the input data and output data are made to perfectly correspond in a one-to-one correspondence manner, the color processes which can completely correct the printer characteristics can be theoretically realized.

However, the above conversion data storing method has a serious drawback such that the necessary memory capacity is extremely large. Namely, assuming that each of the input digital signals Y, M, and C of the respective colors consists of m bits, only $2^m$ states are provided for each color, so that the number of states which can be expressed by synthesizing three colors will be $2^{3m}$. On the other hand, assuming that each of the output signals Y', M', and C' of the respective colors also consists of m bits, $2^{3m}$ bits are necessary as addresses and 3 m bits are needed as data for the color conversion memory 15. Therefore, 23 m ×3 m bits are necessary as the whole memory capacity.

For example, when m=6, ($2^{3m}\times 3$ m$=2^{18}\times 18=$) 4,718,592 bits are needed. When m=8, ($2^{3m}\times 3$m$=2^{24}\times 24=$) 402,653,184 bits are needed. Accordingly, the manufacturing cost of the apparatus becomes very expensive. There is also a problem such that a very large amount of work is required to calculate the data to be stored in the color conversion memory 15 by the simulation.

The ink jet color printer will be further explained in detail as an example.

FIG. 5 shows a method of scanning ink jet heads for obtaining color images by overlapping the inks of three colors; yellow, magenta, and cyan.

In the diagram, reference numerals 101*a* to 101*c* denote multi nozzle heads which are arranged with a distance d held, respectively. Each head is scanned on a recording paper 103 in the direction indicated by an arrow 104 at a speed of v while emitting the ink from an orifice 102. The head 101*a* is used for the yellow ink. The head 101*b* is used for the magenta ink. The head 101*c* is used for the cyan ink. The yellow, magenta, and cyan inks are printed on the recording paper 103 in accordance with this order.

FIG. 6 is a block diagram for the image signal processed by such an ink jet recording apparatus. Input signals 105*a* to 105*c* indicative of the image densities of yellow, magenta, and cyan are input to a color processing unit 106 and subjected to the color processes such as a masking process and the like. Thereafter, the processed signals are input to a gradation correcting unit 107 and are γ corrected. The yellow signal among the three corrected color signals is directly sent to a recording head 109*a*. However, the magenta and cyan signals are temporarily stored into buffers 108*a* and 108*b*, respectively, and thereafter, they are delayed by the times corresponding to the distance d in the scanning direction of the recording head, namely, by the time of d/v in the case of the magenta signal and by the time of 2d/v in the case of the cyan signal and sent to heads 109*b* and 109*c*. Thus, the respective color inks of yellow, magenta, and cyan are printed at the same position on the recording paper 103 and the color image is reproduced.

The γ correction in the gradation correcting unit 107 is performed so as to obtain the linear relation between the input image density signal and the density of the printed image with respect to each color of yellow, magenta, and cyan. The γ characteristics after the correction become as shown in FIG. 7 with regard to yellow, magenta, and cyan.

However, these γ characteristics are obtained when the image is printed in single color of each of yellow, magenta, and cyan. The γ characteristics differ in the case of the mixture of two or three colors.

In the case of the mixture, the γ characteristic of each color component depends on an amount of ink printed previously.

FIG. 8 shows a change in γ characteristic of magenta by the amount of yellow ink printed previously.

In FIG. 8, numeral 110*a* denotes γ characteristic of magenta in the case where no yellow image is printed but the magenta image was first printed. With an increase in yellow print amount, the γ characteristic of magenta changes as shown at 11O*b* to 11O*d*.

FIG. 8 shows the relationship between a driving signal and image density in a situation where one is printed prior to the printing of another color. The driving signal performs the printing of the other color, and the image density is of an image actually reproduced on the paper.

IN this situation, the second color that is printed could be of any color ink (yellow, magenta or cyan). If the printing order of the other color is the second of thereafter (i.e., the other color is printed over the same area where printing of first color occurred), the characteristics of the other color are expressed in FIG. 8.

It is considered that such a phenomenon is caused by the nonlinear mechanism when the ink is absorbed by the paper. However, there is the nonlinear relation between the output image density signal and the color component of the output image because of this phenomenon. Therefore, there is a drawback, that sufficient color reproduction cannot be derived by the linear color correcting processes such as a linear masking method or the like. For example, in the ordinary linear masking method, assuming that the input yellow, magenta, and cyan signals are respectively Y, M, and C, the following conversion is performed.

$$\begin{cases} Y' = a_{11}Y - a_{12}M - a_{13}C \\ M' = -a_{21}Y + a_{22}M - a_{23}C \\ C' = -a_{32}Y - a_{32}M + a_{33}C \end{cases}$$

(wherein $a_{11}$ to $a_{33}$ are constants)

However, according to this method, since there is the linear relation between the input signals and the output signals, it is impossible to correct the printer characteristics which nonlinearly change in accordance with an amount of ink printed previously.

To solve this problem, a method whereby the nonlinear color correction is performed using the masking equations of two or higher order is also proposed. This method, however, has the inconvenience such that the circuit constitution is complicated and expensive.

On the other hand, in the case of using a method whereby tables in the memory are referred to with respect to all of the color correcting processes, there is the inconvenience that a very large amount of memory capacity is necessary as mentioned above.

SUMMARY OF THE INVENTION

It is an object of the present invention to provide a color processing apparatus which can eliminate the above-mentioned drawbacks and can properly correct the color output characteristics of a printer by a simple circuit constitution.

According to one aspect of the present invention, in a color image processing apparatus which receives color component signals of a plurality of colors and performs the color correction using the masking equations in order to form a color image, it is an object to provide a color image processing apparatus in which the values of the coefficients of the masking equations are changed in accordance with the values of the color signals to be multiplied with those coefficients.

According to another aspect of the invention, there is provided dividing means for dividing each of a plurality of input color component signals into a plurality of regions in accordance with the level of each signal and for outputting the data indicative of the region to which each of the input color component signals belongs; coefficient selecting means for outputting a coefficient selection signal in accordance with the combination with respect to respective colors of the data indicative of the region which is output from the dividing means; switching means for switching coefficient values of the linear masking in response to the coefficient selection signal; and linear masking processing means for performing the linear masking processes of the input color component signals using the coefficient values switched by the switching means.

According to still another aspect of the invention, each of the input color component signals is divided into a plurality of regions, the coefficients of the linear masking which has been prepared are selected in accordance with the combination of the regions of each color after the division, and the linear masking arithmetic operations are executed using the selected coefficients, thereby performing the color correction of each color signal. In this manner, since the nonlinear portion is properly finely divided and linearly approximated in each of the divided space, the color characteristics of the printer can be inexpensively and accurately corrected.

Namely, according to the conventional method whereby the linear masking is performed by use of one kind of coefficient with respect to the whole color space as mentioned above, the nonlinear color characteristics of the printer cannot be accurately corrected. However, the present invention is made on the basis of the principle such that by dividing the color space into small spaces, accurate approximation can be accomplished by the linear masking method in each of the divided color spaces, so that the color characteristics of the printer can be practically and sufficiently corrected.

The above and other features of the present invention will become apparent from the following detailed description and the appended claims with reference to the accompanying drawings.

BRIEF DESCRIPTION OF THE DRAWINGS

FIG. 12 is a circuit diagram for changing the masking coefficients;

FIG. 13 is a diagram showing the memory content of an ROM in FIG. 12;

FIG. 14 is a characteristic diagram of the masking coefficients which are derived by an ROM having such a memory content as shown in FIG. 13.

DESCRIPTION OF THE PREFERRED EMBODIMENTS

An embodiment of the present invention will now be described in detail herein below with reference to the drawings.

Figure 1:
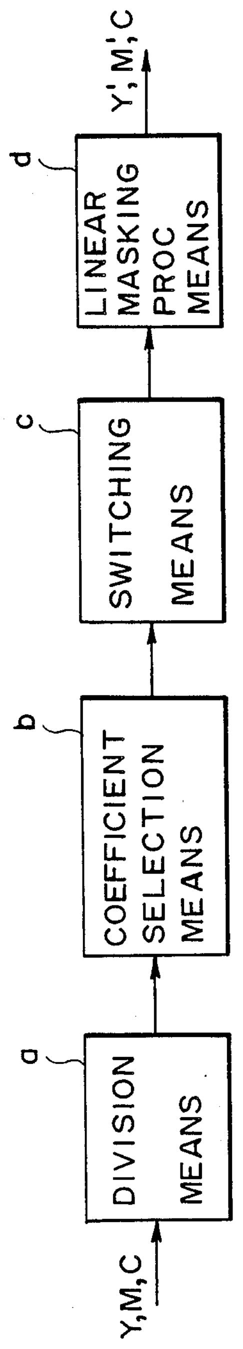
FIG. 1 is a block diagram showing a fundamental constitution of the first embodiment of the present invention.

FIG. 1 shows a fundamental constitution of the first embodiment of the invention. In FIG. 1, a denotes division means for dividing each of the color density input signals Y, M, and C of three colors into a plurality of density regions and for outputting the data indicative of the density region to which the input signal belongs.

b represents coefficient selection means for outputting a coefficient selection signal in accordance with the combination of respective colors of the data indicative of the density region which was output from the division means a.

c indicates switching means for switching the coefficient values of the linear masking in response to the above coefficient selection signal.

d denotes linear masking processing means for performing the linear masking processes of the color density input signals using the foregoing coefficient values switched by the switching means c and for outputting the masked color density signals Y', M', and C'.

Figure 2:
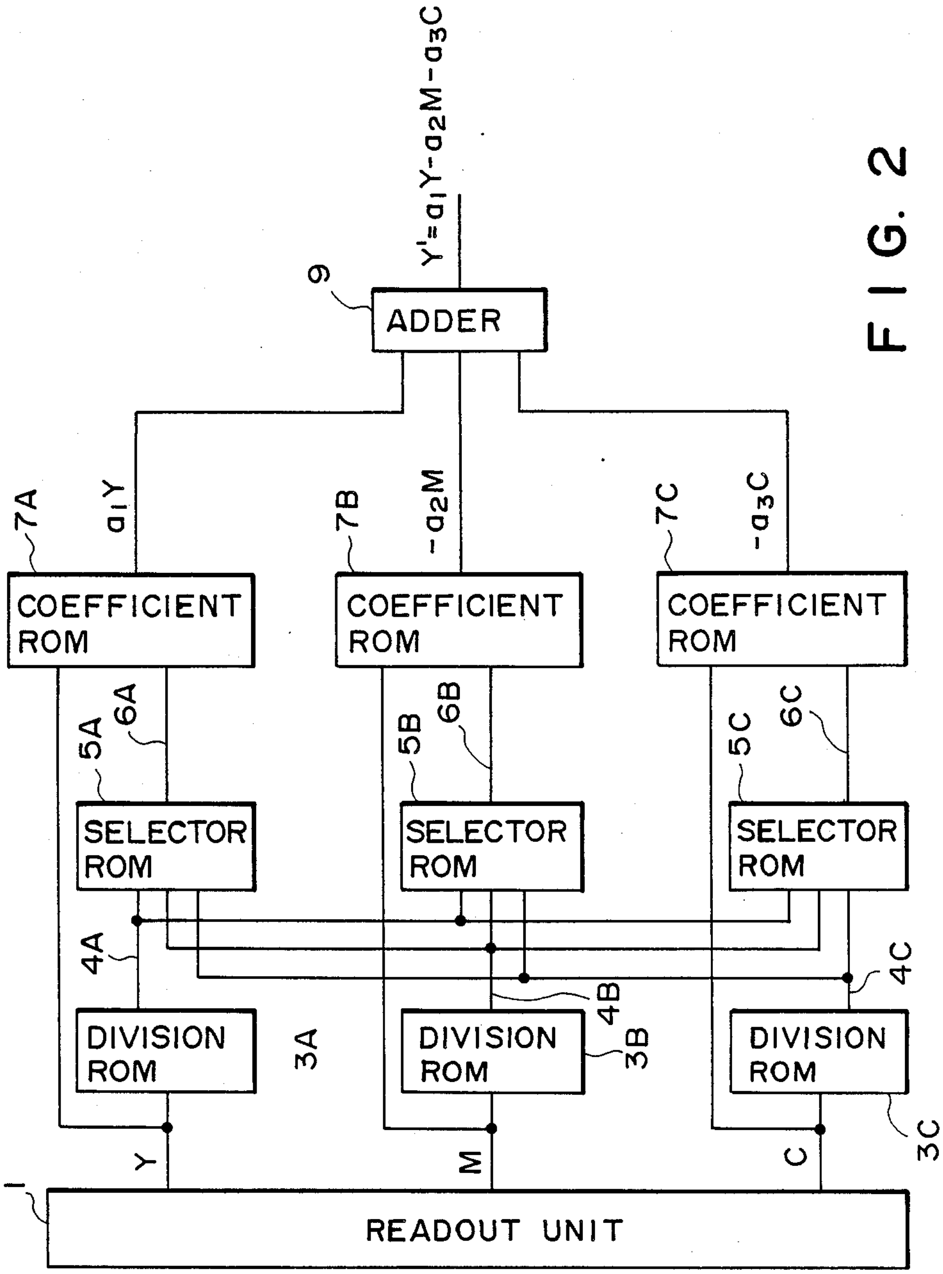
FIG. 2 is a block diagram showing a circuit constitution of the first embodiment of the invention.

FIG. 2 shows a constitution of a Y signal correction processing circuit in a color processing apparatus of the first embodiment of the invention. Since the correction processing circuits of the other M and C signals are constituted in substantially the same manner as the circuit of FIG. 2, their detailed descriptions are omitted.

In FIG. 2, reference numerals 3A, 3B, and 3C denote division ROMs (read only memories with the arithmetic operating function, the same shall apply hereinafter). The division ROMs divide a corresponding one of the 8-bit digital data (color density data) Y, M, and C of the colors yellow, magenta, and cyan which are respectively supplied from the readout unit 1 into sixteen parts and output four-bit division data 4A, 4B, and 4C indicative of the corresponding density regions. In this case, when it is assumed that each of these digital data is divided into sixteen equal parts, the input data of Y, M, and C is used as the address data, and the upper four bits of the input data are previously stored into each address in the internal memories in the division ROMs 3A to 3C. The upper 4-bit data of the addresses corresponding to the 8-bit input digital data Y, M, and C is read out of the memory areas in the division ROMs and output as the division data 4A, 4B, and 4C.

Numerals 5A, 5B, and 5C denote selector ROMs. The three kinds of division data 4A to 4C are respectively input as the address data to the selector ROMs in parallel. Four-bit coefficient selection signals 6A, 6B, and 6C in accordance with the combination of those address data are read out of the memory areas and output.

Numerals 7A, 7B, and 7C denote coefficient ROMs. A combination of a corresponding one of the coefficient selection signals 6A, 6B, and 6C and one of the 8-bit digital data Y, M, and C is input as address data to each of the coefficient ROMs 7A to 7C. One of the 8-bit digital data $a_1Y$, $-a_2M$, and $-a_3C$ as the multiplication values of the optimum linear masking coefficients $a_1$, $-a_2$, and $-a_3$ corresponding to the address data and Y, M, and C is read out of the memory areas and output.

Figure 3:
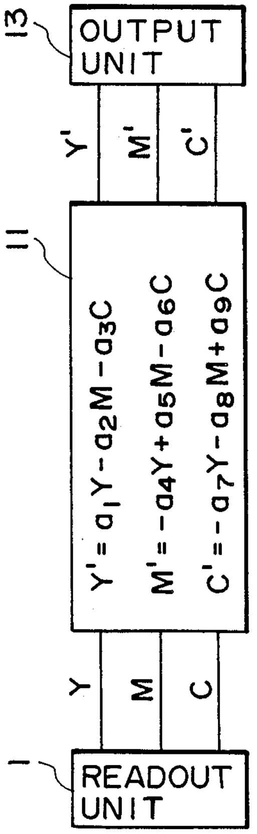
FIGS. 3 and 4 are block diagrams showing constitutions of conventional apparatuses, respectively.

An adder 9 adds the 8-bit digital data of $a_1Y$, $-a_2M$ and $-a_3C$ which are supplied from the coefficient ROMs 7A to 7C and outputs the resultant data to the output unit 13 (refer to FIG. 3) as a yellow output signal Y' which was subjected to the masking process.

The operation of the embodiment will now be described further in detail.

The color image to be read is color separated and read out by the readout unit 1. In the readout unit 1, the color separation signals are converted from the density signals Dr, Dg, and Db of red, green, and blue into the color density signals Y, M, and C of yellow, magenta, and cyan of the 8-bit digital data and sent to the division ROM 3C and coefficient ROM 7C in FIG. 2.

The 8-bit digital data Y, M, and C are stored as the address data into the division ROMs 3A, 3B, and 3C. The 4-bit division data 4A, 4B, and 4C corresponding to those addresses are read out of the memory areas in the division ROMs and transferred to the selector ROMs 5A to 5C.

The division data 4A to 4C of the respective colors are input as the address data into the selector ROMs 5A to 5C in parallel, respectively. The 4-bit coefficient selection signals 6A to 6C corresponding to the combination of the address data are read out of the memory areas in the selector ROMs and output to the coefficient ROMs 7A to 7C.

The operation of the coefficient ROMs will now be explained with respect to the ROM 7A as an example. The yellow input Y is input as the address data and the value $a_1Y$ of which the data Y was multiplied with the coefficient $a_1$ selected by the coefficient selection signal 6A is read out of the memory area and output as the 8-bit data. Sixteen kinds of values are prepared for the coefficient $a_1$. The optimum coefficient $a_1$ corresponding to the combination of the inputs Y, M, and C is selected and read out by the 4-bit coefficient selection signal 6A.

Similarly, the optimum coefficients $a_2$ and $a_3$ are selected and $a_1Y$, $-a_2M$, and $-a_3C$ are output from the respective coefficient ROMs to the adder 9. The yellow output Y' ($=a_1Y-a_2M-a_3C$) after the color process is output from the adder 9 to the output unit.

The foregoing masking processes are also similarly executed for the 8-bit input digital signals M and C. The resultant magenta output M' ($=-a_4Y+a_5M-a_6C$) and cyan output C' ($=-a_7Y-a_8M+a_9C$) are output to the output unit. In the output unit (not shown), the color inks of yellow, magenta, and cyan corresponding to the color density signals Y', M' and C' after the masking processes are printed, thereby obtaining a color image.

As described above, according to this embodiment, the input signals Y, M, and C which are supplied from the readout unit 1 are respectively divided into sixteen parts, thereby dividing the density spaces (gradation regions) of Y, M, and C into the $16^3$ (=4096) regions. Then, by selecting the optimum masking coefficients in the respective spaces by the selector ROMs 5A, 5B, and 5C, the optimum color correcting processes are executed.

In the 4096 small divided spaces, the color characteristics of the printer can be also linearly approximated and the color correction can be accurately performed by the linear masking method.

Therefore, according to the embodiment, the color processes which can properly correct the printer characteristics with regard to the whole color space can be accomplished.

The necessary memory capacities of the various ROMs in the embodiment are as follows.

(1) Division ROMs 3A, 3B, 3C $2^8\times4=1024$ bits for each ROM since the input consists of eight bits and the output consists of four bits (2) Selector ROMs 5A, 5B, 5C $2^{12}\times4=16384$ bits for each ROM since the input consists of twelve bits and the output consists of four bits (3) Coefficient ROMs 7A, 7B, 7C $2^{12}\times8=32768$ bits for each ROM since the input consists of twelve bits and the output consists of eight bits Since the division ROMs can be commonly used for each color, one division ROM, three selector ROMs and three coefficient ROMs are necessary with respect to the correction of each color signal of Y, M, and C. Thus, the memory capacity of total 445,440 ($=1024\times3+16384\times9+32768\times9$) bits is needed.

Figure 4:
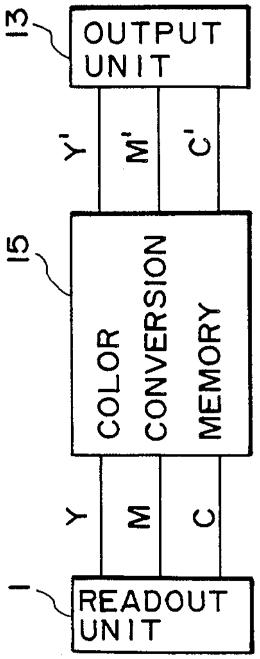

As in the foregoing conventional apparatus of FIG. 4, according to the masking method whereby each combination of the input data Y, M, and C of three colors is made to correspond to the outputs of one set of Y', M', and C', if the input data consists of eight bits, the memory capacity of 402,653,184 ($=2^8\times2^8\times2^8\times8\times3$) bits is necessary. However, according to the subject embodiment, only a memory capacity of 445,440 bits is necessary. Thus, as compared with the foregoing conventional method, the embodiment has an advantage that sufficient color processes can be performed by the small memory capacity of merely 0.11 % (i.e., $445440\div402{,}653{,}184\approx0.0011$).

In the foregoing embodiment of the invention, the ROMs 3A, 3B, and 3C have been used to divide the input data. However, if the input data is divided into equal parts, the upper four bits of the input data are equal to the output of the division ROM. Therefore, for example, the upper four bits of the input data may be also directly supplied as the input address signal into the selector ROM by use of a register without using the ROM. In this case, the necessary memory capacity can be saved by 3072 bits. On the other hand, the method of dividing the input data is not necessarily limited to the method whereby it is divided into equal parts. For example, if data, such as the input data is finely divided in the region where the human sense of sight is sensitive and it is roughly divided in the other regions is previously stored into the ROM, the more natural output image can be derived.

As explained above, if the division ROMs 3A, 3B, and 3C in the embodiment have the function to divide the input data into a plurality of regions, an arbitrary dividing method may be used.

On the other hand, the selector ROMs 5A, 5B, and 5C in the embodiment are not necessarily limited to memory elements but may be encoders which are constituted by logic circuits such as AND (logical product) circuits, OR (logical sum) circuits, and the like. In this case, the necessary memory capacity can be remarkably saved. In brief, it is possible to use the selector ROMs having the function to generate a predetermined selection signal in accordance with the combination of the input signals of three colors.

The coefficient ROMs 7A, 7B, and 7C in the embodiment are not always limited to the memory elements but may be the devices such as to convert the input data Y, M, and C into the analog signals and these analog signals are amplified by operational amplifiers and the amplification factors thereof are switched by the selection signals from the selector ROMs. In this case, the necessary memory capacity can be partially saved. In brief, the devices having the function of switching the coefficients of the linear masking equations in accordance with the selection signal may be used.

On the other hand, the division of the signals, the generation of the selection signals, and the switching of the masking coefficients in the embodiment may be also realized by a constitution using a microcomputer in a software manner.

In addition, although each of the input signals of the respective colors has been divided into sixteen parts in the embodiment, the invention is not limited to this method. Other methods whereby each input signal is divided into a plurality of regions of two or more are incorporated in the scope of the invention. The number of division regions of each color is not necessarily limited to the same number. The number of division regions of each color may be also different. For example, in the case of the linear masking equations of the output yellow signal Y', the input yellow signal is divided into sixteen parts. The input magenta signal M and input cyan signal C are divided into eight parts, respectively.

Further, in this embodiment, each of the coefficient selection signals which are output from the selector ROMs 5A, 5B, and 5C has been set to four bits and sixteen kinds of coefficients have been switched in each of the coefficient ROMs 7A, 7B, and 7C. However, the invention is not limited to these signals. Other coefficient selection signals which can switch two or more coefficients may be used and incorporated in the scope of the invention. Also, the kinds of coefficients of each color are not necessarily limited to the same kind but may be different. For instance, in the case of the linear masking equation (1) of the output yellow signal Y', sixteen kinds of values are provided for the coefficient $a_1$. Eight kinds of values are provided for the coefficients $a_2$and $a_3$, respectively.

On the other hand, the recording method of the output apparatus of the image data processed by the invention is not particularly limited if the output apparatus is the printer which can print a color image such as an ink jet printer, thermal transfer copying printer, electrophotographic printer, or the like.

As described above, according to the first embodiment of the invention, each of the input signals of three colors is divided into a plurality of density regions, the coefficient selection signal is generated in accordance with the combination of the respective division signals indicative of the density regions, and the respective coefficients of the linear masking equation are selected and switched in accordance with the selection signal. Therefore, it is possible to provide a color processing apparatus in which the nonlinear printer color characteristics can be accurately corrected by a simple circuit constitution and good color reproducibility is obtained.

In addition, the first embodiment of the invention has an excellent advantage in that the necessary memory capacity is significantly reduced to, e.g., 0.11 % of that of the conventional apparatus.

The second embodiment of the invention will now be described with reference to FIG. 9 and the subsequent drawings.

Figure 5:
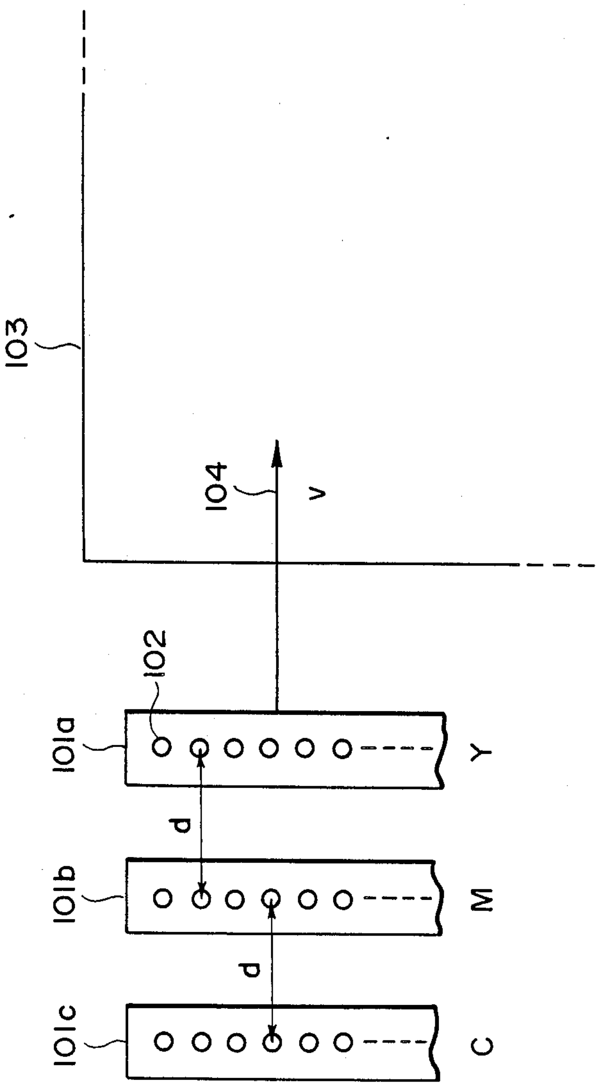
FIG. 5 is a diagram showing an arrangement of recording heads and a scanning direction.
Figure 6:
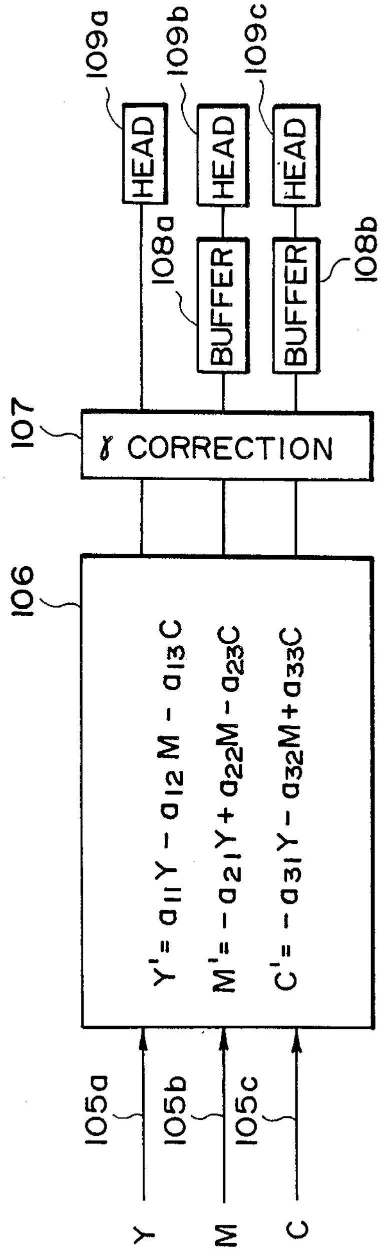
FIG. 6 is an image processing block diagram of a conventional image recording apparatus.
Figure 7:
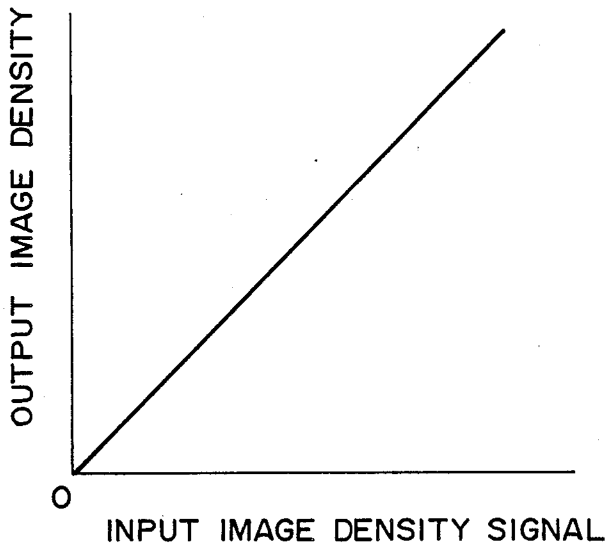
FIG. 7 is a $\gamma$ characteristic graph in the case of a single color.
Figure 9:
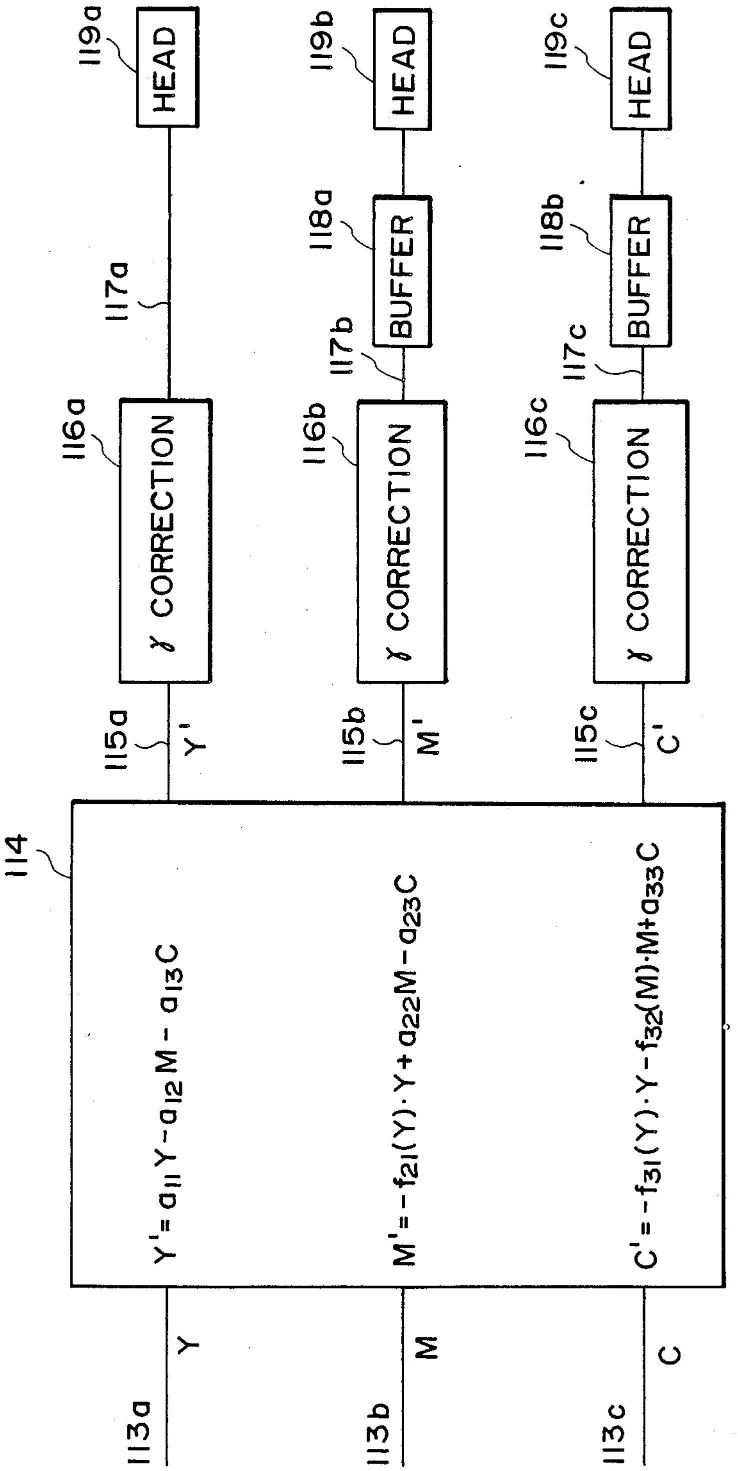
FIG. 9 is an image processing block diagram of an image recording apparatus of the second embodiment of the invention.

FIG. 9 is an image signal processing block diagram of an image forming apparatus of the second embodiment. In this embodiment, ink jet heads are arranged and scanned as shown in FIG. 5. Namely, the print is performed in accordance with the order of yellow, magenta, and cyan.

In FIG. 9, reference numerals 113*a*, 113*b*, and 113*c* denote 6-bit digital input signals Y, M, and C of yellow, magenta, and cyan. These signals are input to a masking circuit 114 from an image reading apparatus, an image data storing apparatus, and the like (not shown).

The masking circuit 114 executes the following color correcting processes.

$$Y' = a_{11}Y - a_{12}M - a_{13}C \qquad (1)'$$

$$M' = -f_{21}(Y)\cdot Y + a_{22}M - a_{23}C \qquad (2)'$$

$$C' = -f_{31}(Y)\cdot Y - f_{32}(M)\cdot M + a_{33}C \qquad (3)'$$

In this embodiment, the magnitudes cf coefficients are changed in accordance with the input levels.

First, since the yellow ink is first printed, the $\gamma$ characteristic does not change by the print of the other color inks. Therefore, $a_{11}$, $a_{12}$, and $a_{13}$ are set to constants similarly to the conventional example.

Figure 8:
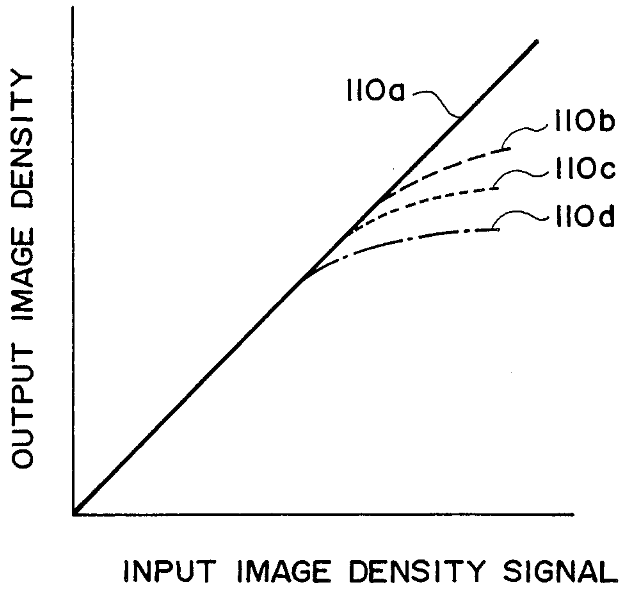
FIG. 8 is a $\gamma$ characteristic graph in the case of mixed colors in a conventional example.

Since the magenta ink is printed after the yellow ink the $\gamma$ characteristic charges in dependence on a printing amount of yellow ink. Namely, as the printing amount of yellow ink increases, the $\gamma$characteristic of magenta becomes gentle as shown in FIG. 8. To correct this, a larger quantity of magenta ink needs to be printed.

Figure 10:
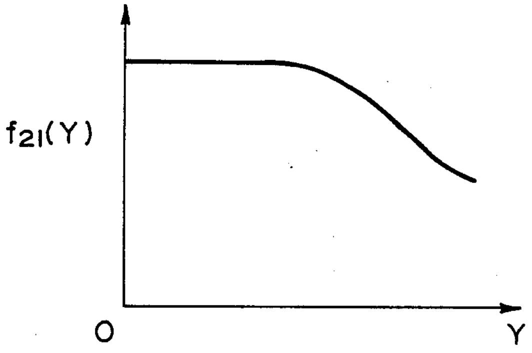
FIG. 10 is a characteristic graph of masking coefficients in the second embodiment.

. For this purpose, the magnitude of $f_{21}$ (Y) is reduced as the value of Y increases as shown in FIG. 10. After the value of Y was converted by the expression (1)', it is further transmitted to the $\gamma$ correcting circuit and becomes the printing signal. Therefore, the value of Y does not always correspond to the printing amount of yellow ink which has previously been printed in a one-to-one correspondence manner. However, as will be obvious from the expression (1)', the printing signal of yellow also increases with an increase in Y. Therefore, by changing the value of $f_{21}(Y)$ as shown in FIG. 10, when the amount of yellow ink previously printed is large, the printing amount of magenta ink is increased over that in the case of masking by use of the constant. Thus, the change of the $\gamma$ characteristic can be corrected.

In the expression (2)', the Y characteristic of magenta is not influenced by the printing amount of cyan ink which is subsequently printed. Therefore, $a_{23}$ is set to a constant and $a_{22}$ is also set to a constant.

Figure 11A:
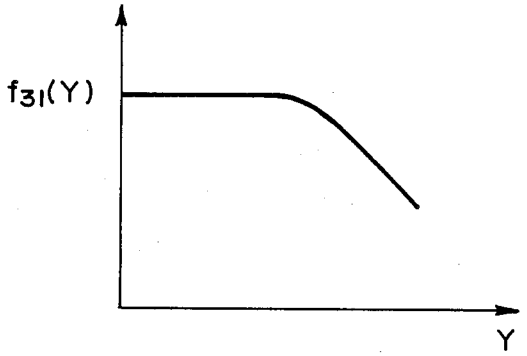
FIGS. 11A and 11B are characteristic graphs of the masking coefficients in the second embodiment.
Figure 11B:
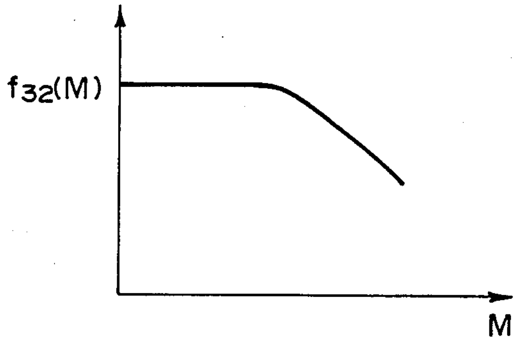

In the next expression (3)', the Y characteristic of cyan is influenced by both the printing amounts of yellow and magenta inks which have previously been printed. Therefore, only $a_{33}$ is set to a constant and $f_{31}(Y)$ and $f_{32}(M)$ are set to values which vary in accordance with the input signals as shown in FIGS. 11A and 11B. Thus, as the printing amounts of yellow and magenta inks previously printed are large, the printing amount of cyan ink increases as compared with that in the case of masking by use of the constant, so that the change in $\gamma$ characteristic can be corrected.

A method as shown in, e.g., FIG. 12 is used to change the values of the coefficients in accordance with the input signals as mentioned above.

The input data Y is input as the address data of a coefficient ROM 20. The value of which the address was multiplied with f is preliminarily stored into each address in the ROM 20 and this value is output. Thus, the f·Y is output for the input Y. If the data f·Y to be stored into this ROM is set as shown in FIG. 13, the value of f for the input Y changes as shown in FIG. 14. By providing such an arithmetic operating ROM for each term of the masking equations and by adding the results of the outputs, the masking processes in the invention can be accomplished.

After the color correction by such masking processes was executed, the gradations of respective corrected signals 115*a*, 115*b*, and 115*c* of yellow, magenta, and cyan are corrected by gradation correcting circuits 116*a*, 116*b*, and 116*c* in FIG. 9, respectively. A yellow signal 117*a* is directly sent to a yellow head 119*a*. A magenta signal 117*b* and a cyan signal 117*c* are sent to buffers 118*a* and 118*b* and delayed by the times corresponding to the distances between the heads. Thereafter, the delayed signals are transmitted to heads 119*b* and 119c. The inks of the respective colors are printed and a color image is reproduced.

In this manner, by changing the masking coefficients in accordance with the magnitudes of the input data, the change in γ characteristic and a change in color balance by the ink previously printed are corrected, so that the gradations and color reproducibility can be remarkably improved.

In the foregoing embodiment, the coefficients of the equation to calculate the color component to be printed later among the masking equations have been changed in accordance with the input. However, the invention is not limited to this but may be also similarly embodied by changing the coefficients of the equation to calculate the color component to be printed first in accordance with the inputs. In this case, the masking equations are set as follows.

$$Y' = a_{11}Y - f'_{12}(M) \cdot M - f'_{13}(C) \cdot C \quad (4)'$$

$$M' = -a_{21}Y + a_{22}M - f'_{23}(C) \cdot C \quad (5)'$$

$$C' = -a_{31}Y - a_{32}M + a_{33}C \quad (6)'$$

Figure 15A:
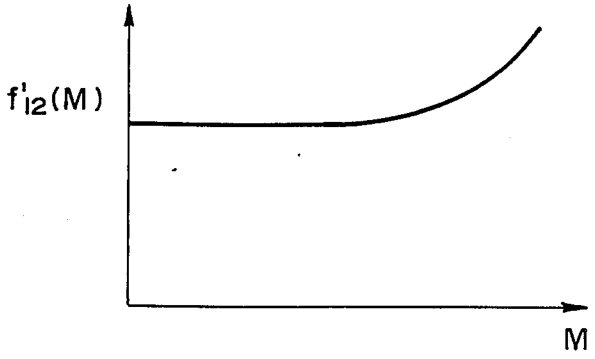
FIGS. 15A to 15C are characteristic graphs of respective color masking coefficients in other embodiments.
Figure 15B:
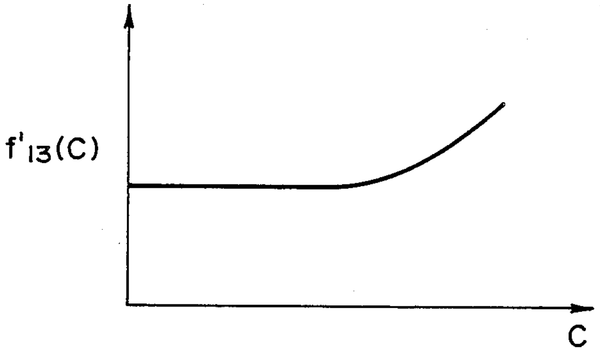
Figure 15C:
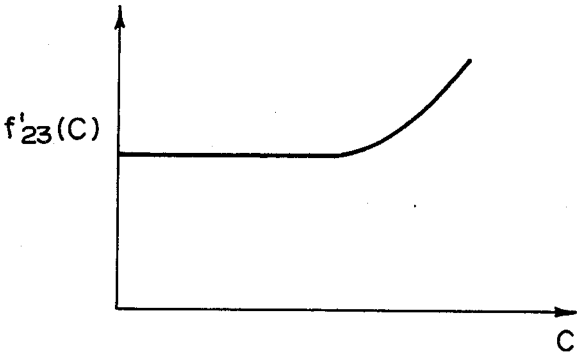

Then, $f'_{12}(M)$, $f'_{13}(C)$, and $f'_{23}(C)$ are changed as shown in FIGS. 15A, 15B, and 15C. By doing this, if there is an ink to be printed later, the amount of ink which is printed first is reduced from that in the case of masking by use of the constant and the change in color balance in the case of the mixed colors shown in FIG. 8 is corrected, so that the stable color reproducibility can be derived.

In the foregoing embodiment the γ characteristic of the color ink to be printed first is not influenced by the printing amount of ink which will be printed later. However, if the distance between the respective heads is narrow or if the absorbing rate of the ink into the paper is slow in dependence on the characteristics of the ink and recording paper, or the like, there is the case where before the ink printed first is sufficiently absorbed into the recording paper, the next ink is printed, so that the γ characteristic of the color ink printed first is influenced by the amount of ink printed later. In such a case, it is sufficient to change the values of $a_{12}$ and $a_{13}$ in the expression (1)' and the value of $a_{23}$ in the expression (2)' in accordance with the input.

Namely, in the case, the values of the coefficients other than the diagonal components of the coefficient matrix change in accordance with the input when it is assumed that $$\begin{pmatrix} Y' \\ M' \\ C' \end{pmatrix} = \begin{pmatrix} a_{11} & -a_{12} & -a_{13} \\ -a_{21} & a_{22} & -a_{23} \\ -a_{31} & -a_{32} & a_{33} \end{pmatrix} \cdot \begin{pmatrix} Y \\ M \\ C \end{pmatrix}$$

The degree of changes in the respective coefficients for the inputs are different in dependence on the inks, recording paper, distance between the respective color heads, head scanning speeds, and the like. Therefore, the relation as shown in FIG. 8 is obtained by the experiments of every combination of the respective colors and the optimum degree of change may be determined on the basis of the resultant data.

In the foregoing embodiment, $a_{11}$ in the expression (1)', $a_{22}$ in the expression (2)', and $a_{33}$ in the expression (3)' have been set to the constants. However, the invention is not limited to those constants. If the γ characteristics of the printer are not linear even in the case of the printing in single color, or the like, the γ characteristics may be also corrected by changing the values of $a_{11}$, $a_{22}$, and $a_{33}$ in accordance with the inputs.

Although the embodiment has been described with respect to the case of printing the inks of three colors of yellow, magenta and cyan, the invention is not limited to this case. A color image may be also reproduced by overlapping four color inks by adding the black ink to those three color inks.

On the other hand, in the case of reproducing a color image by overlapping four color inks including the black ink, assuming that the color inks are printed in accordance with the order of yellow, magenta, cyan, and black, if the invention is embodied by setting the masking equations as follows $$Y' = a'_{11}Y - a'_{12}M - a'_{13}C - a'_{14}Bk$$

$$M' = -f'_{21}(Y) Y + a'_{22}M - a'_{23}C - a'_{24}Bk$$

$$C' = -f'_{31}(Y) Y - f'_{32}(M) M + a'_{33}C - a'_{34}Bk$$

$$Bk' = -f'_{41}(Y) Y - f'_{42}(M) M - f'_{43}(C) C + a'_{44}Bk$$

the γ characteristic of the black component can be also corrected. Thus, the gray balance is further stabilized.

The invention is not limited to the ink jet printer but may be also applied to other color printers of various types.

As described above, according to the second embodiment of the invention, the coefficients of the masking equations to obtain a color image by sequentially printing the coloring agents of a plurality of colors are changed in accordance with the inputs. Thus, the Y characteristic by the coloring agent printed first can be corrected and good gradations and good color reproducibility can be always obtained by the circuit scale which is almost equivalent to that in the conventional linear masking processes.

Fundamentally, the invention uses the linear masking equations, so that the simulation by the computer can be fairly easily performed. Therefore, there is an advantage such that even if the number of divided density regions is large, the optimization can be easily executed.

The present invention is not limited to the foregoing embodiments but many modifications and variations are possible within the spirit and scope of the appended claims of the invention.

What is claimed is:

1. A color processing apparatus comprising:
   input means for receiving a plurality of color component signals;
   a masking circuit for performing a linear masking process for said plurality of color component signals, said masking process utilizing a plurality of coefficients, each having a value; and
   varying means for varying the value of at least one of the coefficients of said masking circuit in accordance with the level of at least one of the plurality of color component signals.

2. A color processing apparatus according to claim 1, wherein the coefficients of said masking circuit whose values are varied are coefficients other than coefficients in a diagonal row of a matrix of the coefficients of said masking circuit.

3. A color processing apparatus according to claim 1, wherein said varying means performs the varying operation such that the values of the coefficients are increased.

4. A color processing apparatus according to claim 1, wherein said varying means performs the varying operation such that the values of the coefficients are decreased.

5. A color processing apparatus according to claim 1, further comprising colorant forming means for forming colorants in a predetermined order on an area in response to the plurality of color component signals processed by said masking circuit.

6. A color processing apparatus according to claim 5, wherein said colorant forming means includes ink jet recording means.

7. A color processing apparatus according to claim 5, wherein said varying means varies the coefficients in accordance with the predetermined colorant formation order of said colorant forming means.

8. A color image processing apparatus comprising:

recording means for sequentially recording a plurality of kinds of colorants in an area of a material;

means for discriminating a signal level corresponding to an amount of one kind of colorant recorded in the area prior to the recording of other kinds of colorants in the area; and correcting means for correcting a signal level corresponding to an amount of at least one of said other kinds of colorants to be recorded in the area after the recording of said one kind of colorant in the area in accordance with the discrimination of said discriminating means.

9. A color image processing apparatus according to claim 8, further comprising input means for inputting a color signal having a plurality of color component signals corresponding to said plurality of kinds of colorants.

10. A color image processing apparatus according to claim 8 wherein said correcting means includes a linear masking process circuit utilizing a plurality of coefficients each having a value to correct the signal levels by varying at least one of coefficients of said masking process circuit.

11. A color image processing apparatus according to claim 10 wherein said correcting means corrects the signal levels by increasing the coefficients.

12. A color image processing apparatus according to claim 10 wherein said correcting means corrects the signal levels by decreasing the coefficients.

13. A color image processing apparatus according to claim 8, wherein said recording means includes ink jet recording means.

* * * * *

UNITED STATES PATENT AND TRADEMARK OFFICE

CERTIFICATE OF CORRECTION

PATENT NO. : 4,853,768

DATED : August 1, 1989

INVENTOR(S) : AKIO SUZUKI, ET AL.

It is certified that error appears in the above-identified patent and that said Letters Patent is hereby corrected as shown below:

COLUMN 2

Line 52, "23 m X 3 m bits" should read --$2^{3m}$ X 3m bits--.

COLUMN 3

Line 48, "110b to 110d." should read --110b to 110d.--.
Line 50, "one is" should read --one color is--.
Line 56, "IN" should read --In--.

COLUMN 4

Line 9, "$C' = -a_{32}Y - a_{32}M + a_{33}C$" should read --$C' = -a_{31}Y - a_{32}M + a_{33}C$--.
Line 21, "such" should be deleted.

COLUMN 5

Line 3, "space," should read --spaces,--.
Line 12, "such" should be deleted.

COLUMN 9

Line 22, "$a_2$and $a_3$," should read --$a_2$ and $a_3$,--.

COLUMN 10

Line 1, "cf" should read --of--.
Line 10, "$\gamma$characteristic" should read --$\gamma$ characteristic--.
Line 29, "Y characteristic" should read --$\gamma$ characteristic--.
Line 33, "Y characteristic" should read --$\gamma$ characteristic--.

UNITED STATES PATENT AND TRADEMARK OFFICE
CERTIFICATE OF CORRECTION

PATENT NO. : 4,853,768

DATED : August 1, 1989

INVENTOR(S) : AKIO SUZUKI, ET AL.

It is certified that error appears in the above-identified patent and that said Letters Patent is hereby corrected as shown below:

COLUMN 11

Line 46, "the case," should read --such case--.
Line 61, "the" (second occurrence) should be deleted.

COLUMN 12

Line 34, "Y" should read --$\gamma$--.

COLUMN 14

Line 13, "claim 8" should read --claim 8,--.
Line 16, "coefficients" should read --the coefficients--.
Line 19, "claim 10" should read --claim 10,--.
Line 22, "claim 10" should read --claim 10,--.

Signed and Sealed this

Ninth Day of October, 1990

Attest:

HARRY F. MANBECK, JR.

Attesting Officer     Commissioner of Patents and Trademarks